United States Patent
Harrison

(10) Patent No.: US 12,249,837 B2
(45) Date of Patent: Mar. 11, 2025

(54) MICROINVERTER FOR USE WITH STORAGE SYSTEM

(71) Applicant: Enphase Energy, Inc., Petaluma, CA (US)

(72) Inventor: Michael J. Harrison, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 78 days.

(21) Appl. No.: 18/084,830

(22) Filed: Dec. 20, 2022

(65) Prior Publication Data

US 2023/0216309 A1     Jul. 6, 2023

Related U.S. Application Data

(60) Provisional application No. 63/296,038, filed on Jan. 3, 2022.

(51) Int. Cl.
| | |
|---|---|
| *H02J 3/38* | (2006.01) |
| *H02J 3/46* | (2006.01) |
| *H02M 3/335* | (2006.01) |

(52) U.S. Cl.
CPC ............... *H02J 3/381* (2013.01); *H02J 3/46* (2013.01); *H02M 3/33584* (2013.01); *H02J 2300/24* (2020.01)

(58) Field of Classification Search
CPC .......... H02J 3/381; H02J 3/46; H02J 2300/24; H02M 3/33584
See application file for complete search history.

(56) References Cited

U.S. PATENT DOCUMENTS

| | | | |
|---|---|---|---|
| 2012/0126755 A1 | 5/2012 | Perisic et al. | |
| 2014/0119086 A1* | 5/2014 | Potharaju | H02J 3/381 |
| | | | 363/132 |
| 2014/0185345 A1 | 7/2014 | Harrison | |
| 2015/0288296 A1 | 10/2015 | Kidera et al. | |
| 2020/0186055 A1* | 6/2020 | Allen, Jr. | H02M 7/5387 |

FOREIGN PATENT DOCUMENTS

| | | | | |
|---|---|---|---|---|
| CN | 210780552 U | | 6/2020 | |
| JP | 08-098558 A | | 4/1996 | |
| JP | 2016530872 A | * | 9/2016 | .......... H02M 7/4815 |
| WO | WO-2013085522 A1 | * | 6/2013 | .............. H02J 3/383 |

OTHER PUBLICATIONS

PCT International Search Report and Written Opinion for Application No. PCT/US2022/053485 dated May 4, 2023, 11 pgs.

* cited by examiner

*Primary Examiner* — Daniel Cavallari
(74) *Attorney, Agent, or Firm* — Moser Taboada

(57) ABSTRACT

Methods and apparatus which use a microinverter comprising integrated neutral forming function for off-grid facilities are provided herein. For example, a microinverter configured for use with an AC storage system comprises switching circuitry connected at an AC output of the microinverter, a three-line connector connected at the AC output and comprising a neutral line connected between two lines configured to connect to at least one of a single phase grid system or a split phase grid system, wherein the neutral line is connected to the microinverter at a point that maintains a mid-way voltage between the two lines voltage.

18 Claims, 2 Drawing Sheets

MICROINVERTER FOR USE WITH STORAGE SYSTEM

CROSS-REFERENCE TO RELATED APPLICATIONS

This application claims the benefit of and priority to U.S. Provisional Application Ser. No. 63/296,038, filed on Jan. 3, 2022, the entire contents of which is incorporated herein by reference.

BACKGROUND

Field

Embodiments of the present disclosure generally relate to distributed energy generation systems and, for example, to methods and apparatus which use a microinverter comprising integrated neutral forming function.

Description of the Related Art

An energy management system provides an innovative solution to a main panel upgrade (MPU) by connecting additional photovoltaics (PVs) and storage system(s) to a smart switch (microgrid interconnect device (MID)), e.g., as opposed to the main panel, thus avoiding the MPU for whole home and subpanel backup systems. With respect to whole home backup, for example, the smart switch is connected between the utility meter and the main panel with an over current protection device that limits the amount of current that can flow to the main panel, thus avoiding the MPU. For the subpanel backup, an installer can move as much load circuits from the main panel to the sub-panel.

Additionally, an AC power grid for can vary based on an area of use. For example, North American and Japanese residential connections are based on a split-phase (e.g., 180° 2-phase) configuration −120V/240 Vac for North America and 100V/200 Vac for Japanese, thus allowing for a mix of single-phase (120 Vac or 100 Vac) and two-phase (240 Vac or 200 Vac) appliances and loads to be used in a residential site. For North American and Japanese connection to function correctly, the AC mains neutral voltage needs to be kept at a voltage that is the mid-way potential between the two phase voltages. Such a function is referred to as neutral forming and is provided by a power utility residential distribution transformer.

Moreover, a microinverter of the storage system is configured to be grid agnostic, i.e., function as a grid connected microinverter when an AC power grid is available and/or function as an off-grid microinverter forming a local microgrid should the AC power grid be non-functional (or not present). While operating in the off-grid mode, a connection to the utility distribution transformer is intentionally severed, thereby removing the neutral forming function that is normally provided by the utility distribution transformer.

Conventional methods and apparatus for achieving a local neutral forming function are based on a line frequency (e.g., 50 Hz or 60 Hz) neutral forming transformer and are configured for single-phase. Such methods and apparatus, however, use a simple laminated steel (e.g., mu metal—nickel-iron soft ferromagnetic alloy) magnetic core with insulated copper windings (magnet wire).

Therefore, there is a need to provide improved methods and apparatus which use a microinverter comprising integrated neutral forming function for off-grid facilities.

SUMMARY

Embodiments disclosed herein provide methods and apparatus which use a microinverter comprising integrated neutral forming function for off-grid facilities. For example, a microinverter configured for use with an AC storage system comprises switching circuitry connected at an AC output of the microinverter, a three-line connector connected at the AC output and comprising a neutral line connected between two lines configured to connect to at least one of a single phase grid system or a split phase grid system, wherein the neutral line is connected to the microinverter at a point that maintains a mid-way voltage between the two lines voltage.

In accordance with at least some aspects of the disclosure, a power conversion system comprises a distributed energy resource comprising a plurality of photovoltaic modules coupled to a plurality of microinverters in at least one of a one-to-one or a two-to-one correspondence and a plurality of storage devices coupled to the plurality of microinverters in a one-to-one correspondence, wherein each microinverter of the plurality of microinverters comprises switching circuitry connected at an AC output of each microinverter; a three-line connector connected at the AC output and comprising a neutral line connected between two lines configured to connect to at least one of a single phase grid system or a split phase grid system, wherein the neutral line is connected to the microinverter at a point that maintains a mid-way voltage between the two lines voltage.

In accordance with at least some aspects of the disclosure, a cycloconverter configured for use with a microinverter comprises switching circuitry connected at an AC output of the microinverter; a three-line connector connected at the AC output and comprising a neutral line connected between two lines configured to connect to at least one of a single phase grid system or a split phase grid system, wherein the neutral line is connected to the microinverter at a point that maintains a mid-way voltage between the two lines voltage.

BRIEF DESCRIPTION OF THE DRAWINGS

So that the manner in which the above recited features of the present disclosure can be understood in detail, a particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

Embodiments of the present disclosure comprise methods and apparatus which use a single phase microinverter comprising integrated neutral forming function. For example, a microinverter configured for use with an AC storage system comprises switching circuitry connected at an AC output of the microinverter. A three-line connector is connected at the AC output and comprises a neutral line connected between two lines configured to connect to at least one of a single phase grid system or a split phase grid system. The neutral line is connected to the microinverter at a point that maintains a mid-way voltage between the two lines voltage. The methods and apparatus described herein provide a required neutral forming transformer function for both North American and Japanese (e.g., 120/240 Vac) split-phase residential off-grid systems that are integrated into a battery storage microinverter. Additionally, the methods and apparatus described herein provide relatively low system/maintenance costs when compared to existing methods and apparatus that use smart grid connection relays.

Figure 1:
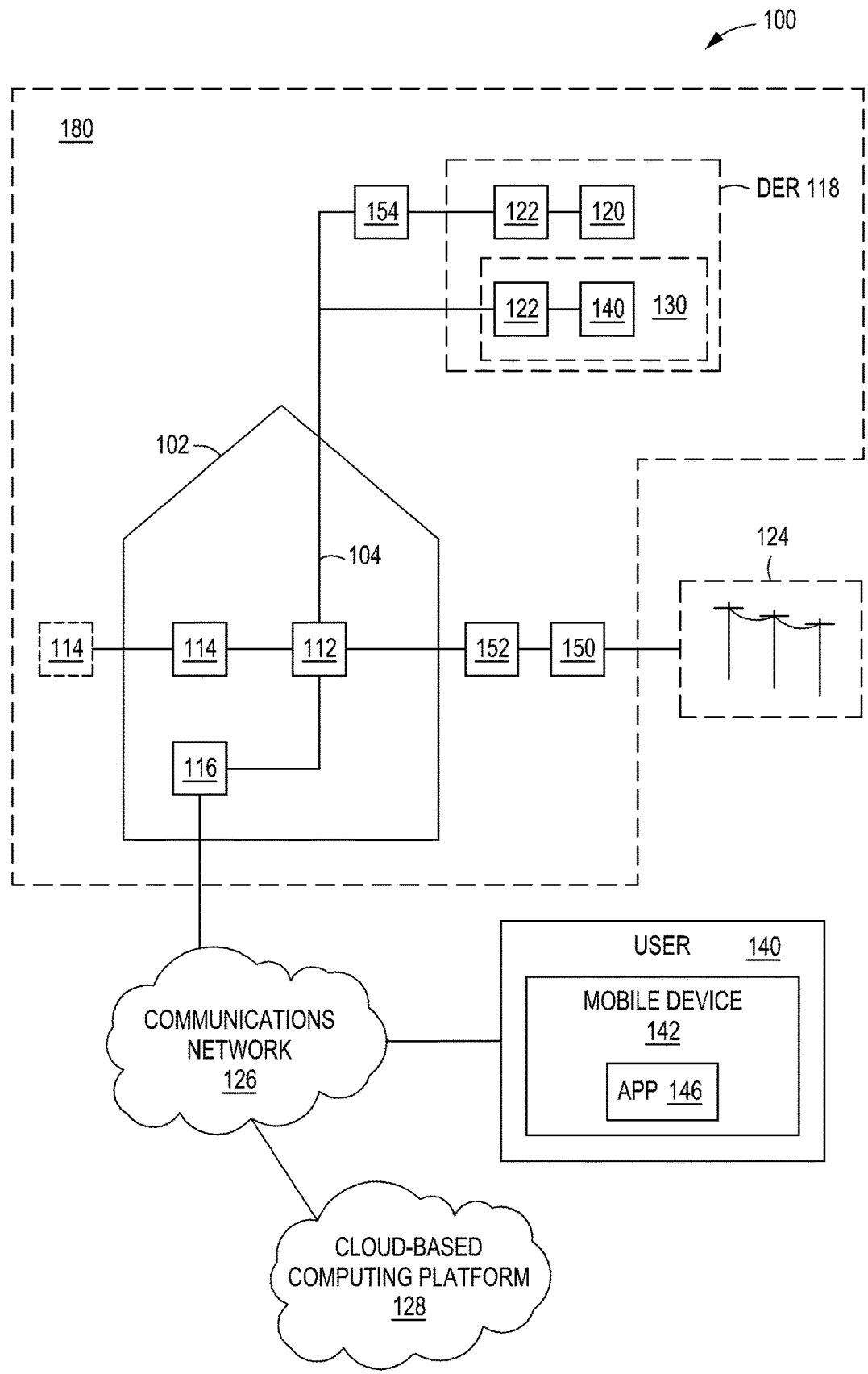
FIG. 1 is a block diagram of a power conversion system, in accordance with at least some embodiments of the present disclosure.

FIG. 1 is a block diagram of a system 100 (e.g., power conversion system), in accordance with at least some embodiments of the present disclosure. The diagram of FIG. 1 only portrays one variation of the myriad of possible system configurations. The present disclosure can function in a variety of environments and systems.

The system 100 comprises a structure 102 (e.g., a user's structure), such as a residential home or commercial building, having an associated DER 118 (distributed energy resource). The DER 118 is situated external to the structure 102. For example, the DER 118 may be located on the roof of the structure 102 or can be part of a solar farm. The structure 102 comprises one or more loads and/or energy storage devices 114 (e.g., appliances, electric hot water heaters, thermostats/detectors, boilers, water pumps, and the like), which can be located within or outside the structure 102, and a DER controller 116, each coupled to a load center 112. Although the energy storage devices 114, the DER controller 116, and the load center 112 are depicted as being located within the structure 102, one or more of these may be located external to the structure 102.

The load center 112 is coupled to the DER 118 by an AC bus 104 and is further coupled, via a meter 152 and a MID 150 (microgrid interconnect device), to a grid 124 (e.g., a commercial/utility power grid). The structure 102, the energy storage devices 114, DER controller 116, DER 118, load center 112, generation meter 154, meter 152, and MID 150 are part of a microgrid 180. It should be noted that one or more additional devices not shown in FIG. 1 may be part of the microgrid 180. For example, a power meter or similar device may be coupled to the load center 112.

The DER 118 comprises at least one renewable energy source (RES) coupled to power conditioners 122 (microinverters). For example, the DER 118 may comprise a plurality of RESs 120 coupled to a plurality of power conditioners 122 in a one-to-one correspondence (or two-to-one correspondence). In embodiments described herein, each RES of the plurality of RESs 120 is a photovoltaic module (PV), e.g., one or more photovoltaic modules, although in other embodiments the plurality of RESs 120 may be any type of system for generating DC power from a renewable form of energy, such as wind, hydro, and the like. The DER 118 may further comprise one or more batteries (or other types of energy storage/delivery devices) coupled to the power conditioners 122 in a one-to-one correspondence, where each pair of power conditioner 122 and a corresponding battery may be referred to as an AC battery 130.

The power conditioners 122 invert the generated DC power from the plurality of RESs 120 and/or the battery 141 to AC power that is grid-compliant and couple the generated AC power to the grid 124 via the load center 112. The generated AC power may be additionally or alternatively coupled via the load center 112 to the one or more loads (e.g., a solar pump) and/or the energy storage devices 114. In addition, the power conditioners 122 that are coupled to the batteries 141 convert AC power from the AC bus 104 to DC power for charging the batteries 141. A generation meter 154 is coupled at the output of the power conditioners 122 that are coupled to the plurality of RESs 120 in order to measure generated power.

In some alternative embodiments, the power conditioners 122 may be AC-AC converters that receive AC input and convert one type of AC power to another type of AC power. In other alternative embodiments, the power conditioners 122 may be DC-DC converters that convert one type of DC power to another type of DC power. In some of embodiments, the DC-DC converters may be coupled to a main DC-AC inverter for inverting the generated DC output to an AC output.

The power conditioners 122 may communicate with one another and with the DER controller 116 using power line communication (PLC), although additionally and/or alternatively other types of wired and/or wireless communication may be used. The DER controller 116 may provide operative control of the DER 118 and/or receive data or information from the DER 118. For example, the DER controller 116 may be a gateway that receives data (e.g., alarms, messages, operating data, performance data, and the like) from the power conditioners 122 and communicates the data and/or other information via the communications network 126 to a cloud-based computing platform 128, which can be configured to execute one or more application software, e.g., a grid connectivity control application, to a remote device or system such as a master controller (not shown), and the like. The DER controller 116 may also send control signals to the power conditioners 122, such as control signals generated by the DER controller 116 or received from a remote device or the cloud-based computing platform 128. The DER controller 116 may be communicably coupled to the communications network 126 via wired and/or wireless techniques. For example, the DER controller 116 may be wirelessly coupled to the communications network 126 via a commercially available router. In one or more embodiments, the DER controller 116 comprises an application-specific integrated circuit (ASIC) or microprocessor along with suitable software (e.g., a grid connectivity control application, switching control circuitry, etc.) for performing one or more of the functions described herein. For example, the DER controller 116 can include a memory (e.g., a non-transitory computer readable storage medium) having stored thereon instructions that when executed by a processor perform a method for grid connectivity control, as described in greater detail below.

The generation meter 154 (which may also be referred to as a production meter) may be any suitable energy meter that measures the energy generated by the DER 118 (e.g., by the power conditioners 122 coupled to the plurality of RESs 120). The generation meter 154 measures real power flow (kWh) and, in some embodiments, reactive power flow (kVAR). The generation meter 154 may communicate the measured values to the DER controller 116, for example using PLC, other types of wired communications, or wireless communication. Additionally, battery charge/discharge values are received through other networking protocols from the AC battery 130 itself.

The meter 152 may be any suitable energy meter that measures the energy consumed by the microgrid 180, such as a net-metering meter, a bi-directional meter that measures energy imported from the grid 124 and well as energy exported to the grid 124, a dual meter comprising two separate meters for measuring energy ingress and egress, and the like. In some embodiments, the meter 152 comprises the MID 150 or a portion thereof. The meter 152 measures one or more of real power flow (kWh), reactive power flow (kVAR), grid frequency, and grid voltage.

The MID 150, which may also be referred to as an island interconnect device (IID), connects/disconnects the microgrid 180 to/from the grid 124. The MID 150 comprises a disconnect component (e.g., a contactor or the like) for physically connecting/disconnecting the microgrid 180 to/from the grid 124. For example, the DER controller 116 receives information regarding the present state of the system from the power conditioners 122, and also receives the energy consumption values of the microgrid 180 from the meter 152 (for example via one or more of PLC, other types of wired communication, and wireless communication), and based on the received information (inputs), the DER controller 116 determines when to go on-grid or off-grid and instructs the MID 150 accordingly. In some alternative embodiments, the MID 150 comprises an ASIC or CPU, along with suitable software (e.g., an islanding module) for determining when to disconnect from/connect to the grid 124. For example, the MID 150 may monitor the grid 124 and detect a grid fluctuation, disturbance or outage and, as a result, disconnect the microgrid 180 from the grid 124. Once disconnected from the grid 124, the microgrid 180 can continue to generate power as an intentional island without imposing safety risks, for example on any line workers that may be working on the grid 124.

In some alternative embodiments, the MID 150 or a portion of the MID 150 is part of the DER controller 116. For example, the DER controller 116 may comprise a CPU and an islanding module for monitoring the grid 124, detecting grid failures and disturbances, determining when to disconnect from/connect to the grid 124, and driving a disconnect component accordingly, where the disconnect component may be part of the DER controller 116 or, alternatively, separate from the DER controller 116. In some embodiments, the MID 150 may communicate with the DER controller 116 (e.g., using wired techniques such as power line communications, or using wireless communication) for coordinating connection/disconnection to the grid 124.

A user 140 can use one or more computing devices, such as a mobile device 142 (e.g., a smart phone, tablet, or the like) communicably coupled by wireless means to the communications network 126. The mobile device 142 has a CPU, support circuits, and memory, and has one or more applications (an application 146, which can be a grid connectivity control application) installed thereon for controlling the connectivity with the grid 124 as described herein. The application 146 may run on commercially available operating systems, such as IOS, ANDROID, and the like.

In order to control connectivity with the grid 124, the user 140 interacts with an icon displayed on the mobile device 142, for example a grid on-off toggle control or slide, which is referred to herein as a toggle button. The toggle button may be presented on one or more status screens pertaining to the microgrid 180, such as a live status screen (not shown), for various validations, checks and alerts. The first time the user 140 interacts with the toggle button, the user 140 is taken to a consent page, such as a grid connectivity consent page, under setting and will be allowed to interact with toggle button only after he/she gives consent.

Once consent is received, the scenarios below, listed in order of priority, will be handled differently. Based on the desired action as entered by the user 140, the corresponding instructions are communicated to the DER controller 116 via the communications network 126 using any suitable protocol, such as HTTP(S), MQTT(S), WebSockets, and the like. The DER controller 116, which may store the received instructions as needed, instructs the MID 150 to connect to or disconnect from the grid 124 as appropriate.

Figure 2:
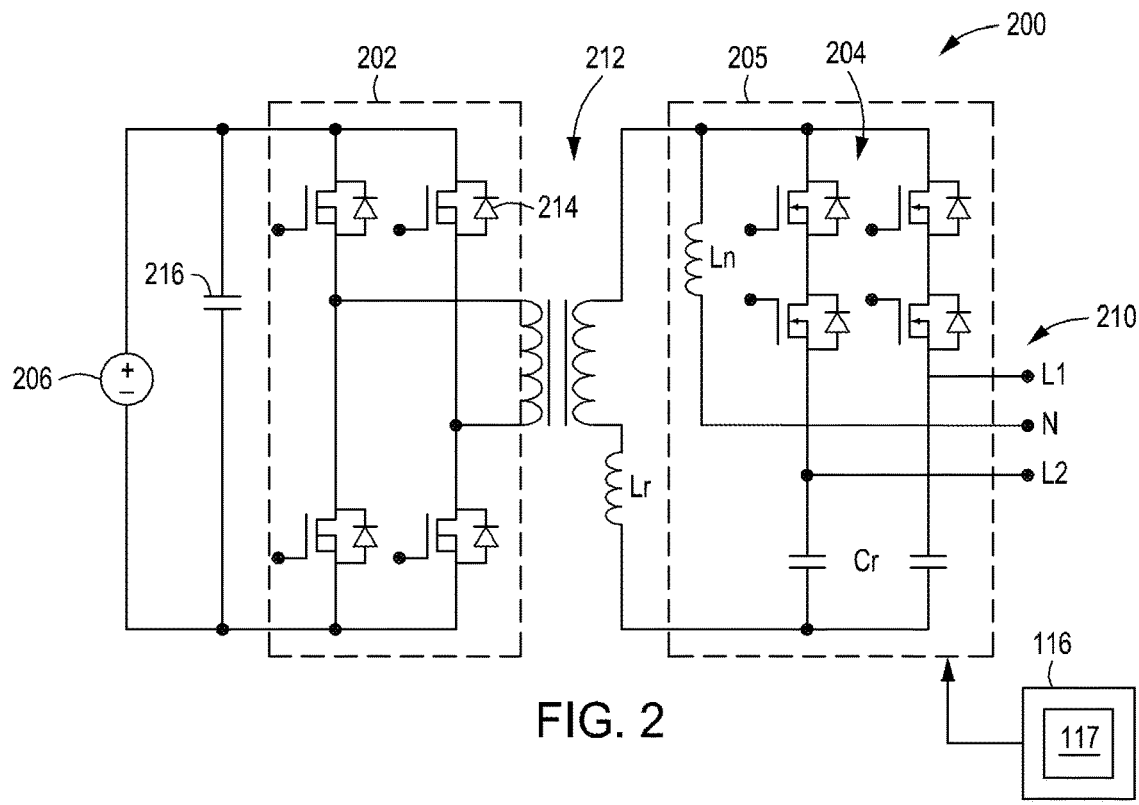
FIG. 2 is a schematic diagram of a microinverter of a storage system configured for use with the energy management system of FIG. 1, in accordance with at least some embodiments of the present disclosure.

FIG. 2 is a block diagram of a microinverter 200 (e.g., power conditioners 122) configured for use with the system 100 of FIG. 1, in accordance with at least some embodiments of the present disclosure. As noted above, the DER controller 116 controls operation of the microinverter 200. For example, in addition to comprising voltage and current sampling circuitry (not shown), control circuitry 117 can be communicatively coupled to a line-cycle monitoring module (not shown) for receiving data used to control a cycloconverter 205 which produces a three-phase AC output. The cycloconverter 205 comprises four (4) AC side MOSFETS 204 (a cycloconverter comprising switches and related components at the output side of the microinverter 200). The control circuitry 117 coordinates timing of the AC side MOSFETS 204 based on measurements from the voltage and current sampling circuitry, e.g., using pulse width modulation (PWM).

The control circuitry 117 controls the AC side MOSFETS 204 to generate a single-phase AC output that is coupled to an AC output port 210. The control circuitry 117 also controls the microinverter 200 to cycle power through (i.e., charge and discharge) a line-cycle energy storage capacitor (a DC side input capacitor 216) to output power that is sinusoidal to AC output port 210 and/or to AC mains.

The control circuitry 117 drives four (4) DC side MOSFETS 202 (input side of microinverter) and the four (4) AC side MOSFETS 204 using power from a housekeeping power supply that derives power from a DC input 206. For example, the housekeeping power supply is powered up from the DC voltage present across the DC side input capacitor 216. A 100 kHz voltage generated across the DC side of the main isolation transformer 212 can be rectified by body-diodes 214 of the DC side MOSFETS 202. The body-diodes 214 of the DC side MOSFETS 202 rectify the 100 kHz voltage and charge up a DC side input capacitor 216. A main control ASIC (e.g., in the DER controller 116) can be powered up and the main control ASIC generates valid gate drivers signals to drive both the DC side MOSFETS 202 and AC side MOSFETS 204. Switching gate drivers of the AC side MOSFETS 204 are configured to drive a voltage into the AC side of a main isolation transformer 212. An inductor Lr is connected in series with a secondary winding of the main isolation transformer 212 and a pair of capacitors Cr are connected in series with a corresponding pair of the AC side MOSFETS 204 to maintain a predetermined voltage at a drain of the corresponding pair of the AC side MOSFETS 204.

The microinverter 200 is bi-directional from a power conversion perspective, i.e., DC→AC and AC→DC, which is central to the microinverter 200 being used in a battery energy storage microinverter. Additionally, the bi-directional functionality of the microinverter 200 allows for PV applications in that the microinverter is able to continue to run once the sun goes down. That is, if the power output from the PV module falls to zero (e.g., at nighttime) the microinverter 200 starts to operate in the AC→DC mode, thus allowing a housekeeping power supply to be powered from power that is derived from the AC side of the microinverter 200. In this way the microinverter 200 is able to run indefinitely during the nighttime.

The microinverter 200 is configured, at the AC output port 210, for connection to a 230 Vac/240 Vac single phase grid and/or a split phase grid. In at least some embodiments (e.g., North American residential applications) an AC output of the microinverter 200 is configured to connect to Line-1 (L1) and Line-2 (L2) connections of a residential 120/240 Vac split-phase system. In at least some embodiments (e.g., rest of world (RoW) applications) the AC output of the microinverter 200 is configured to connect to the L1 and L2 connections (e.g., live & neutral) of the 230 Vac single phase residential system.

The inventor has found that by adding an additional inductor (Ln) provides a third neutral connection (N) to the AC output port 210 of the microinverter 200. The third neutral connection N provides an EMC/surge filter (e.g., a three input and three output connection filter), based on a high frequency switching of the AC side MOSFETS 204 (e.g., AC bridge MOSFETs). For example, under control of the control circuitry 117, a first (top) node of the inductor Ln is alternately connected by the AC side MOSFETS 204 so that the inductor Ln is connected about 50% of the time to the L1 connection and connected about 50% of the time to the L2 connection. In at least some embodiments, the inductor Ln averages out the AC side MOSFETS 204 (AC bridge switching) such that a second (bottom) node of the inductor Ln is maintained at a predetermined voltage. In at least some embodiments, the predetermined voltage can be about mid-way between a potential of the L1 connection and the L2 connection (e.g., an average voltage between the two lines voltage). That is, the additional inductor Ln functions as a neutral forming transformer and, in at least some embodiments, can have the same inductance as the inductor Lr.

Figure 3:
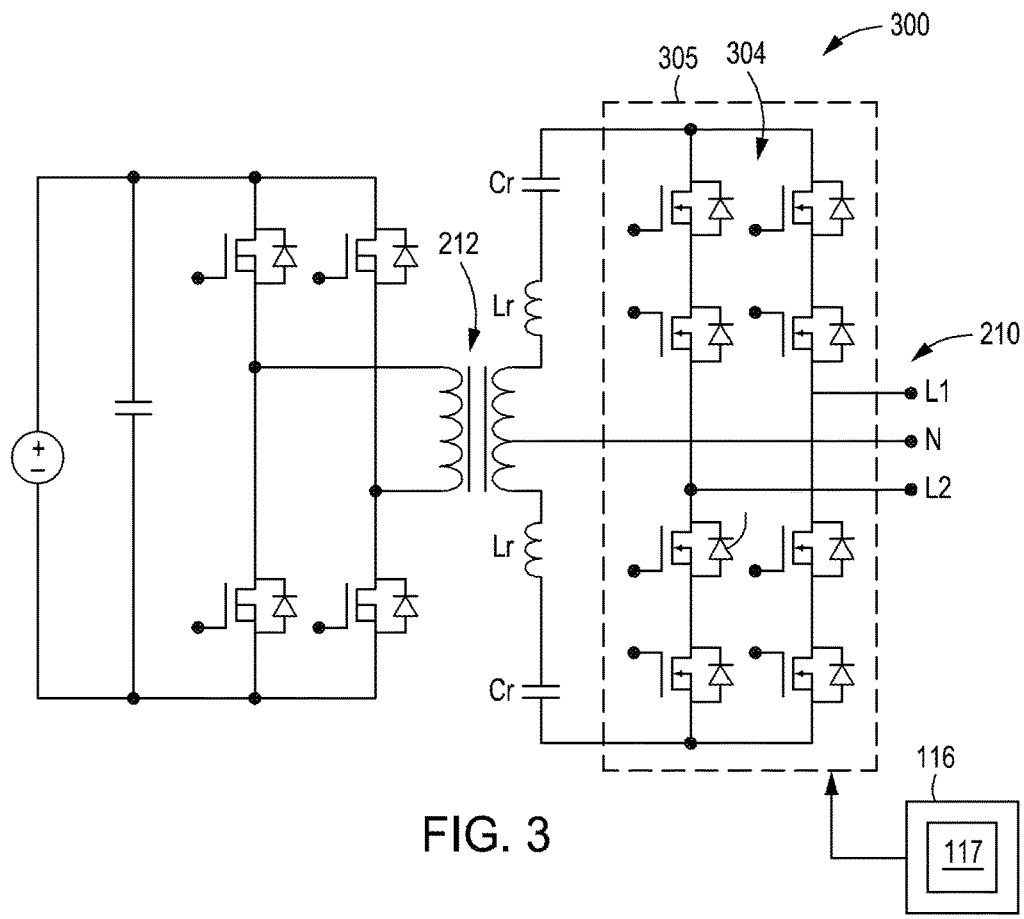
FIG. 3 is a schematic diagram of a microinverter of a storage system configured for use with the energy management system of FIG. 1, in accordance with at least some embodiments of the present disclosure.

FIG. 3 is a schematic diagram of a microinverter 300 of a storage system configured for use with the energy management system of FIG. 1, in accordance with at least some embodiments of the present disclosure. The microinverter 300 is substantially identical to the microinverter 200. Accordingly, only those features that are unique to the microinverter are described herein. For example, unlike the microinverter 200, the microinverter 300 is a full-bridge microinverter. That is, the microinverter 300 comprises cycloconverter 305 comprising eight (8) AC side MOSFETS 304, four (4) AC side MOSFETS 304 connected in series on each leg of the output side of the microinverter 300 300. Additionally, on each side of the secondary windings of the transformer 212 a pair of inductors Lr and Capacitors Cr are connected in series with each other. Moreover, instead of using an inductor Ln, the third neutral connection (N) is directly connected to a mid-point of the secondary windings of the transformer (e.g., center tap—neutral forming transformer). Furthermore, the control circuitry 117 controls the AC side MOSFETS 304 in a manner as described above, making the necessary adjustments to accommodate the four additional MOSFETS. The four additional MOSFETS are driven with the same gate signals but transposed left to right.

While the foregoing is directed to embodiments of the present disclosure, other and further embodiments of the disclosure may be devised without departing from the basic scope thereof.

What is claimed is:

1. A microinverter configured to be connected to an AC storage system, comprising:
   switching circuitry connected at an AC output of the microinverter;
   a three-line connector connected at the AC output and comprising a neutral line connected between two lines configured to connect to at least one of a single phase grid system or a split phase grid system; and
   a first inductor comprising a first node connected between a secondary winding of a transformer and a plurality of bridge mosfets of the switching circuitry and a second node connected to the neutral line,
   wherein the neutral line is connected to the microinverter at a point that maintains a mid-way voltage between the two lines voltage.

2. The microinverter of claim 1, wherein during operation the switching circuitry is configured to maintain the second node at the mid-way voltage.

3. The microinverter of claim 1, wherein the switching circuitry is further configured such that during operation the first node of the inductor is connected to a first line of the two lines 50% of a time and a second line of the two lines the other 50% of the time during operation.

4. The microinverter of claim 1, wherein the switching circuitry is further configured such that during operation the mid-way voltage is maintained at an average voltage between the two lines voltage.

5. The microinverter of claim 1, wherein the plurality of bridge mosfets comprise four (4) AC side mosfets.

6. The microinverter of claim 1, wherein a second inductor is connected in series with the secondary winding.

7. The microinverter of claim 6, wherein the first inductor and second inductor have the same inductance as each other.

8. The microinverter of claim 1, wherein the neutral line is connected to a mid-point of a transformer comprising a primary winding and a secondary winding.

9. The microinverter of claim 8, wherein the switching circuitry comprises a plurality of bridge mosfets, and wherein the plurality of bridge mosfets comprise eight (8) AC side mosfets.

10. The microinverter of claim 8, further comprising a pair of inductors and capacitors that are connected in series with each other.

11. A power conversion system, comprising:
    a distributed energy resource comprising a plurality of photovoltaic modules coupled to a plurality of microinverters in a one-to-one or a two-to-one correspondence and a plurality of storage devices coupled to the plurality of microinverters in a one-to-one correspondence,
    wherein each microinverter of the plurality of microinverters comprises:
    switching circuitry connected at an AC output of each microinverter;
    a three-line connector connected at the AC output and comprising a neutral line connected between two lines configured to connect to at least one of a single phase grid system or a split phase grid system; and
    a first inductor comprising a first node connected between a secondary winding of a transformer and a plurality of bridge mosfets of the switching circuitry and a second node connected to the neutral line,
    wherein the neutral line is connected to the microinverter at a point that maintains a mid-way voltage between the two lines voltage.

12. The power conversion system of claim 11, wherein during operation the switching circuitry is configured to maintain the second node at the mid-way voltage.

13. The power conversion system of claim 10, wherein the switching circuitry is further configured such that during operation the first node of the inductor is connected to a first line of the two lines 50% of a time and a second line of the two lines the other 50% of the time during operation.

14. The power conversion system of claim 10, wherein the switching circuitry is further configured such that during operation the mid-way voltage is maintained at an average voltage between the two lines voltage.

15. The power conversion system of claim 10, wherein the plurality of bridge mosfets comprise four (4) AC side mosfets.

16. The power conversion system of claim 11, wherein a second inductor is connected in series with the secondary winding.

17. The power conversion system of claim 16, wherein the first inductor and second inductor have the same inductance as each other.

18. A cycloconverter configured for use with a microinverter, comprising:
 switching circuitry connected at an AC output of the microinverter; and
 a three-line connector connected at the AC output and comprising a neutral line connected between two lines configured to connect to at least one of a single phase grid system or a split phase grid system; and
 a first inductor comprising a first node connected between a secondary winding of a transformer and a plurality of bridge mosfets of the switching circuitry and a second node connected to the neutral line,
 wherein the neutral line is connected to the microinverter at a point that maintains a mid-way voltage between the two lines voltage.

* * * * *